(12) United States Patent
Globus et al.

(10) Patent No.: US 7,683,130 B2
(45) Date of Patent: Mar. 23, 2010

(54) FILLED PERFLUOROPOLYMER COMPOSITION COMPRISING A LOW MELTING FLUOROPOLYMER ADDITIVE

(75) Inventors: Yevgeniy I. Globus, Littleton, MA (US); Mark A. Jozokos, Pelham, NH (US); Sundar Kilnagar Venkataraman, Avondale, PA (US); Heidi Elizabeth Burch, Parkersburg, WV (US)

(73) Assignees: E.I. du Pont de Nemours and Company, Wilmington, DE (US); Alphagary Corporation, Leominster, MA (US)

( * ) Notice: Subject to any disclaimer, the term of this patent is extended or adjusted under 35 U.S.C. 154(b) by 541 days.

(21) Appl. No.: 11/484,946

(22) Filed: Jul. 12, 2006

(65) Prior Publication Data

US 2007/0015874 A1 Jan. 18, 2007

Related U.S. Application Data

(60) Provisional application No. 60/700,167, filed on Jul. 18, 2005.

(51) Int. Cl.
*C08K 3/00* (2006.01)
*C08K 3/22* (2006.01)
*C08K 3/34* (2006.01)
*C08L 27/12* (2006.01)

(52) U.S. Cl. .................. 525/199; 525/200; 524/414; 524/430; 524/432; 524/433; 524/437

(58) Field of Classification Search ................. 525/199, 525/200; 524/414, 430, 432, 433, 437
See application file for complete search history.

(56) References Cited

U.S. PATENT DOCUMENTS 4,520,170 A * 5/1985 Kitto .......................... 525/200
5,547,761 A 8/1996 Chapman, Jr. et al.
5,677,404 A 10/1997 Blair
5,708,131 A 1/1998 Morgan
5,888,424 A 3/1999 Ebnesajjad et al.
5,919,878 A 7/1999 Brothers
6,153,681 A 11/2000 Bekiarian
6,197,904 B1 3/2001 Gangal et al.
6,468,280 B1 10/2002 Saenger et al.
6,706,819 B1 * 3/2004 Araki et al. .................. 525/199
6,884,847 B2 * 4/2005 Irie et al. ..................... 525/191
7,135,527 B2 * 11/2006 Park ........................... 525/199
2006/0041058 A1 * 2/2006 Yin et al. ...................... 525/50
2007/0015875 A1 * 1/2007 Globus et al. ............... 525/199

FOREIGN PATENT DOCUMENTS

| EP | 1 591 469 A1 | 11/2005 |
|---|---|---|
| WO | WO 97/36954 | 10/1997 |
| WO | WO 99/11706 | 3/1999 |
| WO | WO 00/08346 | 2/2000 |
| WO | WO 2005/073984 A1 | 8/2005 |

OTHER PUBLICATIONS

Ullmann'S Encyclopedia of Industrial Chemicals, vol. A 11, pp. 417-420, VCH Verlagsgesellschaft mbH, D6940, Weinheim, Germany, 1988.
J. Scheirs, Ed., "Modern Fluoropolymers", pp. 72-73. Wiley, New Yor, 1997.
S. Enbesajjad, "Fluoroplastics, vol. 1 Non-Melt-Processible Fluoroplastics", Published by the Plastics Design Library (2000), p. 4 and 133.
"Ullmann'S Encyclopedia of Polymer Science and Engineering", Published by VCH Verlagsgesellschaft MBH (1988), p. 396.
Encyclopedia of Polymer Science and Engineering, vol. 16, Published by John Wiley & Sons, Inc. (1988), pp. 577 and 605.

* cited by examiner

*Primary Examiner*—Nathan M Nutter

(57) ABSTRACT

The present invention relates to plenum cables jacketed with a composition comprising perfluoropolymer, inorganic char-forming agent, and fluoropolymer additive, which composition passes the NFPA-255 burn test.

16 Claims, No Drawings

FILLED PERFLUOROPOLYMER COMPOSITION COMPRISING A LOW MELTING FLUOROPOLYMER ADDITIVE

BACKGROUND OF THE INVENTION

1. Field of the Invention

This invention relates to filled compositions of perfluoropolymer comprising a low melting fluoropolymer additive.

2. Description of Related Art

Plenum cable is cable used for data and voice transmission that is installed in building plenums, i.e., the spaces above dropped ceilings or below raised floors that are used to return air to conditioning equipment. The cable comprises a core which performs the transmission function and a jacket over the core. Typical core constructions include a plurality of twisted pairs of insulated wires or coaxially-positioned insulated conductors.

Cable jackets of polyvinyl chloride (PVC) and flame retardant additives are known for plenum cable, but the resultant compositions do not pass the National Fire Protection Association (NFPA)-255 burn test (Surface Burning of Building Materials), which requires non-flammability and low-to-no smoke emission. UL 2424, Appendix A, provides that cables tested in accordance with NFPA-255 must have a smoke developed index (hereinafter Smoke Index) of no greater than 50 and a flame spread index (Flame Spread Index) of no greater than 25. Heretofore, these attributes of plenum cable jackets have been evaluated by UL-910 (NFPA-262—Standard Method of Test for Flame Travel and Smoke of Wires and cables for Use in Air-Handling Spaces), but as concerns about fire safety have risen, it has been found that cable jackets of PVC composition that pass the NFPA-262 test do not pass the more severe NFPA-255 test.

Cable jackets of tetrafluoroethylene/hexafluoropropylene (FEP) copolymer are also known for plenum cable, that do pass the NFPA-255 burn test. Such FEP has a melt flow rate (MFR) of 2-7 g/10 min, which means that it has a high melt viscosity. Because of this high melt viscosity, this FEP has the disadvantage of high production cost cable jacket, because this FEP is only capable of being extruded at a rate (line speed) of up to about 120 ft/min. Higher MFR (lower melt viscosity) FEP has been tried as cable jacket, but such jacket does not pass the NFPA-255 test. As the MFR increases above 7 g/10 min, the resultant lower melt viscosity of the FEP causes it to drip and smoke, resulting in a Smoke Index of greater than 50. It is noteworthy that this FEP is not flammable, i.e. it simply melts and drips and does not form a carbonaceous char. The same is true with other high MFR melt-fabricable perfluoropolymers.

BRIEF SUMMARY OF THE INVENTION

The present invention satisfies the need for a polymer composition that is sufficiently non-flammable, non-dripping, and non-smoke emitting during exposure to fire that the composition passes the NFPA-255 burn test, i.e. has a Smoke Index of no greater than 50 and Flame Spread Index of no greater than 25. The composition satisfying this need comprises perfluoropolymer, about 10-60 wt % char-forming inorganic agent, and about 0.1 to 5 wt % low melting fluoropolymer additive to total 100 wt % based on the combined weight of said perfluoropolymer, agent and low melting fluoropolymer additive. This composition as a melt blend such as a melt-extruded article, passes the NFPA-255 burn test. The perfluoropolymers used in the present invention do not, by themselves, pass the NFPA-255 burn test. The combination of just the char-forming inorganic agent and the perfluoropolymer tends to improve the performance of the perfluoropolymer in the burn test, but, typical of highly filled polymer, the physical properties of the melt-fabricated product formed from the composition deteriorate. The low melting fluoropolymer additive is necessary to obtain a perfluoropolymer composition that both passes the NFPA-255 burn test and has good physical properties. As one skilled in the art will recognize, the ability of the composition of the present invention to pass the NFPA-255 burn test is demonstrated by melt-fabricating an article from the composition and subjecting that article to the burn test. In this regard, the composition of the present invention is especially useful as cable jacket for plenum cable, the jacket being formed by extrusion over and onto the core of the cable. The jacket composition of the present invention can be considered to pass the NFPA-255 burn test when the entire cable is subjected to the test and passes the test. This is confirmed by substituting a jacket such as a polyvinyl chloride composition over the same cable core, and the cable fails the burn test because the jacket does not pass this test. Thus, it is clear that when the jacket of the composition of the present invention is responsible for the cable passing the test, the jacket itself can be considered to pass the burn test.

In addition, with the present invention, the volume resistivity of a composition which incorporates a low melting fluoropolymer additive is higher, actually much higher, than with a hydrocarbon polymer additive present. The composition of the present invention therefore also exhibits improved electrical performance, notably reduced conductivity as cable jacket, as compared to the perfluoropolymer/char forming agent composition wherein hydrocarbon polymer is present to improve physical properties of the bicomponent composition. This improvement is especially useful in a cable jacket wherein the cable is coaxial cable.

DETAILED DESCRIPTION OF THE INVENTION

The perfluoropolymers used in the composition of the present invention are those that are melt-fabricable, i.e. they are sufficiently flowable in the molten state that they can be fabricated by melt processing such as extrusion, to produce products having sufficient strength so as to be useful. The melt flow rate (MFR) of the perfluoropolymers used in the present invention is relatively high, preferably at least about 10 g/10 min, more preferably at least about 15 g/10 min, even more preferably at least about 20 g/10 min, and most preferably, at least 26 g/10 min, as measured according to ASTM D-1238 at the temperature which is standard for the resin (see for example ASTM D 2116-91a and ASTM D 3307-93). The relatively high MFR of the perfluoropolymers prevents them by themselves from passing the NFPA-255 burn test. As indicated by the prefix "per", the monovalent atoms bonded to the carbon atoms making up the polymer are all fluorine atoms. Other atoms may be present in the polymer end groups, i.e. the groups that terminate the polymer chain. Examples of perfluoropolymers that can be used in the composition of the present invention include the copolymers of tetrafluoroethylene (TFE) with one or more perfluorinated polymerizable comonomers, such as perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers are those in which the alkyl group contains 1, 2, 3 or 4 carbon atoms, respectively known as perfluoro(methyl vinyl ether) (PMVE), perfluoro(ethyl vinyl ether) (PEVE), perfluoro(propyl vinyl ether) (PPVE), and perfluoro(butyl vinyl ether) (PBVE). The copolymer can be made using several PAVE monomers, such as the TFE/perfluoro(methyl vinyl ether)/perfluoro(propyl vinyl ether) copolymer, sometimes called MFA by the manufacturer. The preferred perfluoropolymers are TFE/HFP copolymer in which the HFP content is about 9-17 wt %, more preferably TFE/HFP/PAVE such as PEVE or PPVE, wherein the HFP content is about 9-17 wt % and the PAVE content, preferably PEVE, is about 0.2 to 3 wt %, to total 100 wt % for the copolymer. These polymers are commonly known as FEP. TFE/PAVE copolymers, generally known as PFA, have at least about 1 wt % PAVE, including when the PAVE is PPVE or PEVE, and will typically contain about 1-15 wt % PAVE. When PAVE includes PMVE, the composition is about 0.5-13 wt % perfluoro(methyl vinyl ether) and about 0.5 to 3 wt % PPVE, the remainder to total 100 wt % being TFE, and as stated above, may be referred to as MFA.

The inorganic char-forming agent is comprised of at least one inorganic compound that forms, including promoting the formation of, a char in the NFPA-255 burn test. In the burn test, the agent does not prevent the perfluoropolymer from burning, because the fluoropolymer is not flammable. By not flammable is meant that the fluoropolymer does not burn in the NFPA-255 burn test, whereby it has a Flame Spread Index of no greater than 25. Instead, the char-forming agent contributes to formation of a char structure that prevents the total composition from dripping, which would lead to objectionable smoke formation and failure of the burn test. It is unexpected that char-forming agent would have any utility when used with non-flammable perfluoropolymer. Although the perfluoropolymer does not burn, it appears that the char-forming agent interacts with the perfluoropolymer during the burn test to prevent the high MFR perfluoropolymer from dripping, whereby the creation of smoke is suppressed. Although the combination of the perfluoropolymer and char-forming agent is melt flowable (extrudable), which suggests that the composition would drip when subjected to burning, the composition does not drip. The char-forming agent thus appears to act as a thixotropic agent in the article of the composition being subjected to burn. This thixotropic effect can be quantified by rheology (oscillatory shear) measurement using an ARES® Dynamic Rheometer as shown in the following Table.

TABLE

Variation of Viscosity with Shear Rate at 340° C.

| Shear (rad/s) | FEP (MFR 30) | FEP (MFR 7) | Smoke-Guard® FP | Viton® VTX | Viton® HV | Kalrez® K2000 |
|---|---|---|---|---|---|---|
| 100 | 1106 | 2810 | 4919 | 4421 | 1960 | 4266 |
| 10 | 1601 | 6202 | 12673 | 9541 | 3839 | 11752 |
| 1 | 1766 | 7970 | 46186 | 19252 | 5859 | 31521 |
| 0.1 | 1860 | 8691 | 262000 | 55232 | 9774 | 145000 |

Complex Viscosity (Pa·s)

FEP refers to tetrafluoroethylene/hexafluoropropylene copolymer, the MFR 30 type having lower viscosity than the MFR 7. SmokeGuard® FP (AlphaGary, Leominster Mass. USA) is a commercial composition of perfluoropolymer, char-forming agent and hydrocarbon polymer to improve the physical properties of the composition. The columns headed "Viton" and "Kalrez" summarize results for compositions similar to that of SmokeGuard® FP but which differ in that they have no hydrocarbon polymer, but rather fluoropolymer additive to improve the physical properties of the composition (see Example 1).

In the Table, the MFRs are in units of g/10 min. The Table shows that the increase in viscosity (complex viscosity) as shear rate decreases from 100 rad/s to 0.1 rad/s is about 3× for the 7 MFR FEP, about 1.6× for the 30 MFR FEP, about 53× for SmokeGuard® FP. The inventive Viton® and Kalrez® compositions show increases of 12.5 (Viton® VTX), 5.0× for (Viton® A HV), and 34× (Kalrez® K2000).

The shear rate of 0.1 rad/s is an approximation of the shear condition to which the article melt-fabricated from the composition of the present invention is subject in applications that may be exposed to fire. The extremely high viscosity of the inventive compositions at 0.1 rad/s explains the suppression of dripping of the composition of the present invention. Such high viscosity indicates that the composition will not drip in the NFPA-255 burn test, where the only shear imposed on the molten composition is that due to gravity, and therefore will not cause smoke. As the shear is increased to the shear that is characteristic of melt fabrication by extrusion, the melt viscosity of the composition decreases to be similar to that of the MFR 30 FEP at the same shear rate.

While the suppression of dripping and therefore suppression of smoke is one manifestation of the char-forming agent used in the present invention, the formation of char is the effect that is visible in the aftermath of the NFPA-255 burn test. Instead of the jacket having the appearance of a misshapen solidified melt, the jacket has the appearance ranging from an intact, unaffected jacket, to areas wherein the jacket exhibits fractures, to areas wherein the jacket is fractured into flakes, and to areas wherein the flakes have fallen off the cable. The fractured portions of the jacket and the flakes thereof can be considered a char in the sense of being a residue of the "burned" jacket. This char however, is not black as would be characteristic if the char were carbonaceous. The C—F chemical bonds of the perfluoropolymer are so strong that the polymer is well known to form volatile fluorocarbon compounds when subjected to burning rather than to decomposing to leave a carbon residue. Even if the flakes fall away from the cable, they do not cause smoke such that the cable would fail the NFPA-255 burn test. Plenum cable jacketed with the composition of the present invention passes this test.

The char-forming agent is thermally stable and non-reactive at the melt processing temperature of the composition, in the sense that it does not cause discoloration or foaming of the composition, which would indicate the presence of degradation or reaction. The agent itself has color, typically white, which provides the color of the melt processed composition. In the burn test however, the formation of char indicates the presence of degradation.

The composition of the present invention is highly filled, the char-forming agent constituting at least about 10 wt % of the composition (total weight of perfluoropolymer, agent, plus low melting fluoropolymer additive). The amount of agent necessary to form sufficient char will depend on the agent, the particular perfluoropolymer used and its MFR. Some agents are more effective than others, whereby a relatively small amount will suffice for the composition (jacket) to pass the NFPA-255 burn test. Generally, sufficient char can be obtained when the composition contains about 20 to 50 wt % of the inorganic char-forming agent. Examples of char-forming agents are zinc molybdate, calcium molybdate, and metal oxides such as ZnO, $Al_2O_3$, $TiO_2$, and $MgZnO_2$. Preferably the mean particle size of the char-forming agent is no greater than about 3 µm, and more preferably, no greater than about 1 µm, to provide the best physical properties for the composition. Another example of inorganic char-forming agent is ceramic microspheres, such as Zeeospheres® ceramic microspheres available from the 3M Company, which are understood to be alkali alumina silicates, which may have a larger mean particle size than about 3 μm, e.g. as large as about 5 μm, with smaller particle sizes, such as no greater than about 3 μm mean particle size being preferred. Preferably, the mean minimum particle size is at least about 0.05 μm; smaller particle sizes tend to embrittle the composition. In one embodiment of the present invention, the inorganic char forming agent comprises a plurality of char-forming agents. In another embodiment of the present invention, at least one of this plurality of char-forming agents is ceramic microspheres. A preferred composition comprises about 5 to 20 wt % ceramic microspheres and about 20-40 wt % of another char-forming agent, preferably ZnO, to constitute the about 10-60 wt % char-forming agent component of the composition of the present invention.

As used herein, the term "low melting fluoropolymer additive" (fluoropolymer additive) means a fluoropolymer having a melting point, or if having no melting point, i.e. being amorphous, having a glass transition thermoplastic elastomer has a melting point) of the thermoplastic segments, which thereby act as crosslinking sites, tying the polymer chains together. The melting point or Tg of thermoplastic elastomer elastomeric segments according to this invention will be below that of the perfluoropolymer that makes up the major part of the composition, as disclosed above.

The fluorine content of the fluoropolymer additive should be at least about 35 wt %, preferably at least about 40 wt %, more preferably at least about 45 wt %, still more preferably at least about 50 wt % and most preferably at least about 60 wt %. It is preferably perfluorinated.

Examples of suitable fluoropolymer additives according to this invention include ethylene/tetrafluoroethylene (ETFE) copolymers described in U.S. Pat. No. 6,197,904, which have melting points around 200° C. Examples also include tetrafluoroethylene/hexafluoropropylene copolymers such as those described in U.S. Pat. Nos. 5,547,761, 5,708,131, and 6,468,280. Examples further include tetrafluoroethylene/perfluoro(alkyl vinyl ether) copolymers such as are described in U.S. Pat. No. 5,919,878.

Fluoroelastomers suitable for use as fluoropolymer additives according to the present invention are described in Ullmann's Encyclopedia of Industrial Chemistry, Vol. A 11, pp. 417-420, VCH Verlagsgesellschaft mbH, D6940, Weinheim, Germany, 1988.

One type of fluoroelastomer suitable for use with the present invention is a dipolymer of vinylidene fluoride (VDF) and hexafluoropropene (HFP). This elastomer is sold under the trademark Viton® A HV by DuPont Performance Elastomers (Wilmington Del. USA). Another type of vinylidene fluoride based elastomer suitable for use with the present invention is the TFE-containing terpolymer, vinylidene fluoride/hexafluoropropene/tetrafluoroethylene, VDF/HFP/TFE copolymer (also known as THV elastomer), sold under the trademark Viton® B by DuPont Performance Elastomers. This terpolymer is even more thermally stable and solvent resistant than Viton® A. It should be noted that not all THV polymer is elastomeric. The range of compositions with elastomeric temperature (Tg), at least about 10° C. below that of the perfluoropolymer that makes up the major part of the composition, apart from the char-forming agent. It is preferable that the melting point, or in the absence of the melting point, the Tg of the fluoropolymer additive, be at least about 25° C. lower, more preferably at least about 50° C. lower, still more preferably at least about 100° C. lower, even more preferably at least about 150° C. lower, and most preferably at least about 200° C. lower, than that of the perfluoropolymer that makes up the major part of the composition, apart from the char-forming agent. It is further preferable that the fluoropolymer additive be amorphous, and more preferable still that the fluoropolymer additive be a fluoroelastomer.

By amorphous is meant that any detectable melting endotherm has a heat of fusion no greater than about 5 J/g as measured by differential scanning calorimetry, preferably less than about 3 J/g, more preferably less than about 1 J/g, most preferably no detectable heat of fusion. The measurement is the "first heat", that is the measurement is made on the polymer that has not previously been heated for melt processing, or to temperatures above about 125° C. Determination of heats of fusion is done according to ASTM D-3418-03.

As used herein, fluoroelastomer is amorphous and has a glass transition temperature (Tg) at or below about room temperature (20° C.), preferably below 10° C. It is understood that in some applications fluoroelastomer is crosslinked, usually as the final step in processing, after molding or otherwise being shaped. According to this invention, it is not preferred that the fluoroelastomer be crosslinked, or that crosslinking agents or curing agents be included.

Fluoropolymer additive as defined here includes thermoplastic fluoroelastomer, as for example the thermoplastic fluoroelastomer described in U.S. Pat. No. 6,153,681. Thermoplastic fluoroelastomer has elastomeric and thermoplastic segments (sometimes called soft and hard segments) in the polymer chain. The elastomeric segments have the properties of Tg and heat of fusion as described in the preceding paragraph. Thermoplastic fluoroelastomer spontaneously crosslinks on cooling through the association or cocrystallization (in which case the character is summarized in "Modern Fluoropolymers", J. Scheirs, ed, pp. 72-73, Wiley, New York, 1997.

Perfluorinated elastomers are also suitable for use with the present invention. Such perfluorinated elastomers are produced by the copolymerization of tetrafluoroethylene (TFE) and perfluoro(methyl vinyl ether) also described in Ullmann's, supra. Such perfluorinated elastomers are sold under the trademark Kalrez® Elastomers by DuPont Performance Elastomers. Another type of elastomer suitable for use with the present invention is a tetrafluoroethylene-propylene elastomer. This TFE/propylene elastomer is sold under the trademark Viton® VTX by DuPont Performance Elastomers.

The fluoropolymer additive is used in the composition of the present invention in an amount that is effective to provide the physical properties desired. The fluoropolymer additive itself does not provide the improved physical properties. Instead, the fluoropolymer additive interacts with the char-forming agent and perfluoropolymer to limit the reduction in tensile properties that the agent if used by itself would have on the perfluoropolymer composition. Without the presence of the fluoropolymer additive, the melt blend of the perfluoropolymer/char-forming agent tends to be cheesy in appearance, i.e. to lack integrity, e.g. showing cracks and containing loose, unincorporated agent. With the fluoropolymer additive being present, a uniform-appearing melt blend is obtained, in which the entire char-forming agent is incorporated into the melt blend. The char-forming agent does not adhere to the perfluoropolymer, and yet, surprisingly, the fluoropolymer additive acts as a dispersing agent for the char-forming agent in the perfluoropolymer. The effectiveness of the dispersion effect of the fluoropolymer additive can be characterized by the tensile test specimen of the composition of the present invention exhibiting an elongation of at least about 100%, preferably at least about 150%. The specimen also preferably exhibits a tensile strength of at least about 1500 psi (10.3 MPa). Preferably these properties are achieved on cable jacket specimens in accordance with ASTM D 3032 under the operating conditions of the tensile testing jaws being 2 in (5.1 cm) apart and moving apart at the rate of 20 in/min (51 cm/min).

Fluoroelastomers are thermally stable at the melt temperature of the perfluoropolymer, and thus, do not appreciably cross-link during thermal processing. Thus, fluoroelastomers provide this benefit to the composition.

The amount of fluoropolymer additive necessary to provide beneficial effect in the composition will generally be about 0.1 to 5 wt %, depending on the amount of char-forming agent that is present in the composition. Preferably the amount of such polymer present is about 0.5 to 3 wt %, based on the total weight of perfluoropolymer, char-forming agent and fluoropolymer additive.

The composition of the present invention can be in the form of the physical mixture of the components or a melt blend thereof, and the melt blend can be in the form of the desired melt-fabricated article, such as the jacket of data transmission cable. The composition of the present invention is also dry as is required for melt fabrication, such as by extrusion. By "dry" is meant that the composition is not in the form of a dispersion or suspension in a liquid medium such as would be used for spray coating of a substrate.

The composition of the present invention will typically be subjected to two melt-processing treatments. First, the composition is preferably melt blended, such as by using a twin-screw extruder or a Buss Kneader® compounding machine, to form molding pellets, each containing all three ingredients of the composition. The molding pellets are a convenient form for feeding to melt processing equipment such as for extruding the composition into the fabricated article desired, such as jacket for (on) twisted pair cable. The Buss Kneader® operates by melting the polymer components of the composition and shearing the molten composition to obtain the incorporation of the char-forming agent into the perfluoropolymer with the aid of the fluoropolymer additive. The residence time of the composition in this type of melt processing equipment may be longer than the residence time in extrusion equipment. To avoid degradation, the Buss Kneader® is operated at the lowest temperature possible consistent with good blending, barely above the melting temperature of the perfluoropolymer, while the extrusion temperature can be considerably higher, because of its shorter residence time. Other additives that do not contribute to flammability or smoke in the NFPA-255 burn test, such as pigment, can also be compounded into the composition of the present invention.

The composition of the present invention is especially useful as the jacket of plenum cable, to enable such cable to pass the NFPA-255 burn test. The most common such cable will contain four twisted pairs of insulated wires, but the jacket can also be applied to form cable of many more twisted pairs of insulated wires, e.g. 25 twisted pairs, and even cable containing more than 100 twisted pairs. It is preferred that the wire insulation of the twisted pairs be also made of perfluoropolymer. It has been found that when the entire wire insulation is replaced by polyolefin, e.g. polyethylene, the jacketed cable fails the NFPA-255 burn test.

A jacket made of perfluoropolymer that passes the NFPA burn test has a low melt flow rate, for example about 2-7 g/10 min, which for jacketing for twisted pairs of insulated wires or insulated coaxial wire, is limited to a very low line speed in the extrusion/jacket operation, of about 100 ft/min (30.5 m/min). Compositions of the present invention, notwithstanding their high filler (char-forming agent) content, can be extruded as cable jacket at line speeds of at least about 300 ft/min (91.5 m/min), preferably at about 400 ft/min (122 m/min). Line speed is the windup rate for the cable, which is also the speed of the assemblage of twisted pairs fed through the extruder crosshead to receive the jacket. The rate of extrusion of molten composition is less than the line speed, with the difference in speeds being made up by the draw down ratio of the extruded tube of molten composition drawn down in a conical shape to contact the assemblage of insulated wires. Draw down ratio is the ratio of the annular cross section of the extrusion die opening to the annular cross section of the jacket.

The composition of the present invention, while capable of high speed extrusion cable jacketing, also produces a smooth jacket, which maintains the positioning of the twisted pairs within the jacket, but does not adversely affect electrical properties such as the attenuation of the electrical signal by the cable. The uneven outline (outer surface) of the twisted pairs within the cable should be barely to not at all visible from the exterior of the cable, whereby the outside of the jacket has a smooth appearance not conforming to the topography of the core of twisted pairs of insulated wires. Sometimes this is referred to as a "loose fit" but the fit of the jacket over the twisted pairs is snug enough that the jacket does not slide over the surface of the twisted pairs to form wrinkles.

Articles other than cable jacketing can be advantageously melt fabricated from compositions of the present invention. Examples of such articles include tubing, especially conduit (raceways) for data and voice transmission cable, profiles (spacers) for twisted pair cables, and tape for bundling cables.

In another embodiment of the present invention, the composition further comprises an inorganic phosphor in an effective amount to color said composition when subjected to excitation radiation. The phosphor also similarly colors the article made from the composition so that the manufacturing source of the composition from which the article is made is detectable. U.S. Pat. No. 5,888,424 discloses the incorporation of inorganic phosphor into colorant-free fluoroplastics in very small amounts, up to 450 ppm. The phosphor typically comprises an inorganic salt or oxide plus an activator, the combination of which is sensitive to exposure to radiation in the 200-400 nm wavelength region causing fluorescence in the visible or infrared wavelength region. This fluorescence, constituting emitted radiation, gives a colored appearance to the composition or article made therefrom, which is characteristic of the phosphor. The phosphors disclosed in the '424 patent are useful in the present invention, except that a greater amount is required for the colored appearance to be seen. Thus, in accordance with this embodiment of the present invention, the amount of phosphor is about 0.1 to 5 wt %, preferably about 0.5 to 2 wt %, based on the combined weight of perfluoropolymer, char-forming inorganic agent, fluoropolymer additive and phosphor. By way of example, the composition of Example 2 is supplemented with 0.5 to 1 wt % of ZnS/Cu:Al phosphor by dry mixing of the phosphor with the other jacket ingredients prior to extrusion, and the resultant jacket when subjected to ultraviolet light of 365 nm wavelength, gives a green appearance to the jacket in the visible wavelength region. When the ultra-violet light source is turned off, the jacket returns to its original white appearance. It will be noted that the phosphor of Example 30 of the '424 patent includes ZnO, which is the inorganic char-forming agent in the aforesaid Example 2. When this particular char-forming agent is used, an activator such as the Zn of phosphor/activator combination no. 30 of Table 1 of the '424 patent is all that need be added to the composition of the present invention to obtain a similar phosphor effect, i.e. fluorescence to produce a green color. Thus, in another embodiment of the present invention, when the char-forming inorganic agent has the ability to become a phosphor when suitably activated, an effective amount of such activator is added to the composition to produce the phosphor effect.

EXAMPLES

In the Examples below, the three-components: FEP, fluoropolymer additive, and inorganic char-forming compound are melt-blended together by the following general procedure: The perfluoropolymer compositions are prepared using a 70 millimeter diameter Buss Kneader® continuous compounder and pelletizer. A Buss Kneader® is a single reciprocating screw extruder with mixing pins along the barrel wall and slotted screw elements. The extruder is heated to temperatures sufficient to melt the polymers when conveyed along the screw. All ingredients are gravimetrically fed into the Buss Kneader® from one of the multiple feed ports along the barrel. The Buss Kneader® mixes all the ingredients into a homogeneous compound melt. The homogeneous compound melt is fed into a heated cross-head extruder and pelletized. The description of the compositions in terms of "parts" refers to parts by weight unless otherwise indicated.

The general procedure for forming a jacket of the melt blended composition involves extruding the blend as a jacket over a core of four twisted pairs of FEP-insulated wires to form jacketed cable, using the following extrusion conditions: The extruder has a 60 mm diameter barrel, 30:1 L/D, and is equipped with a metering type of screw having a compression ratio with the respect to the barrel of about 3:1 as between the feed section of the screw and the metering section, i.e. the free volume, that is the volume in the extruder barrel that is unoccupied by the screw, wherein the screw flights in the feed section are about three times (3×) the volume within the screw flights within the metering section. For a screw of constant pitch, the compression ratio is the ratio of the flight depth in the feed section to the flight depth in the metering section (metering into the crosshead). The application of heat to the extruder barrel starts with 530° F. (277° C.) in the feed section, increasing to 560° F. (293° C.) in the transition section and then to 570° F. (298° C.) in the metering section. The extruder is fitted with a B&H 75 crosshead. The assemblage of four twisted pairs of FEP-insulated wires is fed though the cross-head and out the die tip of the crosshead. The temperature of the molten fluoropolymer at the die surrounding the die tip is 598° F. (314° C.). The outer diameter of the die tip is 0.483 in (12.3 mm) and the inner diameter of the die is 0.587 in (14.9 mm), with the annular space between the die tip and the I.D. of the die forming the annular space through which a molten tube of FEP is extruded and drawn down to coat the assemblage of twisted pairs of insulated wire. No vacuum is used to draw the extruded tube down onto the core of twisted pairs insulated wires. The draw down ratio is 10:1, the thickness of the jacket being 10 mils (250 µm), and the draw ratio balance is 0.99. Draw ratio balance is the draw ratio of the molten polymer at the I.D. of the die vs. the draw ratio of the molten polymer at the die tip. The line speed is 403 ft/min (123 m/min).

The fire test chamber (elongated furnace) and procedure set forth in NFPA-255 is used to expose 25 ft (7.6 m) lengths of cable to burning along 5 ft (1.5 m) of the 25 ft length (7.6 m) of the furnace, the furnace being operated according to the instructions set out in NFPA-255. The lengths of cable for testing are placed in side-by-side contact with one another so as to fill the test space above the burner of the furnace with a bed of single thickness cable, and the cable is supported by metal rods spanning the furnace and spaced one foot (30.5 cm) apart along the length of the furnace and the length of the cables. Additional support for the cables is provided by steel poultry netting (chicken wire), the poultry netting laying on the metal rods and the cable laying on the poultry netting, as set forth in Appendix B-7.2. A large number of cables, each 25 ft (7.6 m) long, are laid side-by-side on the poultry netting as described above. For the common 4-pair twisted cable, having a jacket thickness of about 10 mils (0.25 mm), more than 100 cables, each 25 feet (7.6 m) in length, are tested at one time.

The Flame Spread Index is determined in accordance with Chapter 3, Appendix A of NFPA-255.

The Smoke Index is determined using the smoke measurement system described in NFPA-262 positioned in an exhaust extension of the furnace in which the burn test is conducted. The smoke measurement system includes a photoelectric cell, which detects and quantifies the smoke emitted by the cable jacket during the 10-minute period of the burn test. The software associated with the photoelectric cell reports the % obscuration in the exhaust stream from the furnace in the ten-minute period, and the area under the % obscuration/time curve is the Smoke Index (see NFPA-255, Appendix A, 3-3.4 for the determination of Smoke Index). The Flame Spread Index and Smoke Index are determined on as-is lengths of cable, i.e. without slitting the jacket lengthwise and without first exposing the cable to accelerated aging. The chemical stability of perfluoropolymer, however, enables the tensile and burn results after aging at 158° C. for seven days to be about as good as the results before aging.

Limiting Oxygen Index (LOI) is measured according to the method of ASTM D2863-97. Sample size is 0.125 in×0.25 in×5 in (0.318 cm×0.635 cm×12.7 cm), die cut from a sheet rolled or pressed to the specified thickness.

Volume resistivity is measured according to the general procedure of ASTM D257-99. Sample thickness is 0.125 in (0.318 cm). A model 1864 megohmmeter (QuadTech, Inc, Maynard Mass. USA) is used. Sample is placed on a sheet of aluminum foil (such as "Reynolds Wrap") approximately 3 in (75 cm) in diameter, and covered with a second sheet of aluminum foil of the same diameter. A weighted conical electrode (45.48 cm$^2$ in area) is used. Measurement is made at 500 V. Volume resistivity (VR) is calculated according to the equation:

$$VR(\text{ohm·cm}) = (45.48 \text{cm}^2 \times \text{measured resistance (ohm)})/\text{sample thickness (cm)}$$

The FEP used as the primary insulation on the twisted pairs of wires used in the Examples has an MFR of 28 g/10 min and contains PEVE comonomer as described in U.S. Pat. No. 5,677,404. The same FEP is used in the jacket composition in the following Examples unless otherwise specified.

Comparative Example A

A jacket composed only of the FEP fails the NFPA-255 burn test. Tensile testing of compression molded plaques (ASTM D 638) of the FEP results in tensile strength and elongation of 3259 psi (22.5 MPa) and 350%.

A jacket of the FEP plus Viton® A HV also fails the NFPA-255 burn test.

A composition of FEP and 30 wt % ZnO (Kadox® 930) reduces the MFR of the FEP to 20-22 g/10 min, and compression molded plaques exhibit less than desired tensile properties: tensile strength of 1536 psi (10.6 MPa) and elongation of only 106%.

From this comparative Example, it is seen that neither the char-forming agent with the perfluoropolymer, nor the fluoropolymer additive with the perfluoropolymer, form compositions that pass the NFPA-255 burn test and have good physical properties.

Comparative Example B

A jacket having the following composition: FEP 100 parts, aromatic hydrocarbon elastomer (Kraton® G1651) 1 part per hundred parts FEP (pph), and 66.66 pph Kadox® 930 ZnO (mean particle size of 0.33 μm (total weight of composition is 176.66 parts), is formed. The jacket has a wall thickness of 9-10 mil (0.23-0.25 mm) and the overall cable has a diameter of 0.166 in (4.2 mm) and forms a snug fit (exhibiting a cylindrical appearance, not conforming to the surface topography of the core of twisted pairs of insulated wires) over the 4 twisted pairs of insulated wire in the cable. 121 lengths of this cable are simultaneously subjected to the burn test under NFPA-255, with the result being a Flame Spread Index of 0 and a Smoke Index of 29. The surface of the jacket is smooth and the tensile strength and elongation of the rod samples of the composition are 2235 psi (15.4 MPa) and 165%, respectively. The tensile properties of the jacket itself are tested in accordance with ASTM D 3032, wherein a length of jacket is cut circumferentially and is slipped off the cable to form the test specimen. The test conditions are a spacing of 2 in (5.1 cm) between the tensile tester jaws, and the jaws being pulled apart at the rate of 20 in/min (51 cm/min). The jacket specimen so-tested exhibits a tensile strength of 2143 psi (14.8 MPa) and elongation of 301%. The jacket also exhibits a dielectric constant at 100 MHz of 3.32. When the burn test is repeated on this cable after aging at 158° C. for 7 days, it exhibits a Flame Spread Index of 0 and Smoke Index of 25.

The jacketed cable is measured for volume resistivity (VR) and is found to have a VR of $2.68 \times 10^6$ ohm.cm when made, rising to $1.3 \times 10^{11}$ ohm.cm after 1 to 7 days and stabilizing at that value. The limiting oxygen index is measured and found to be >100% (the specimen does not burn in 100% oxygen atmosphere).

Example 1

Four samples of jacket cable are made, the jackets being of compositions similar to that of Comparative Example B except that in place of the Kraton® hydrocarbon elastomer, there are used (a) Viton® VTX, (b) Viton® A HV, and (c) Kalrez® K2000. The samples show the same good results in the burn test (Flame Spread Index and Smoke Index) as seen in Comparative Example B. The jacket shows substantially the same good physical properties (tensile and elongation) as seen in Comparative Example B.

Limiting oxygen index for all of the jackets is >100%.

Volume resistivity of each is about $3.49 \times 10^{10}$ ohm.cm the day they are made, rising to and leveling off at $2.68 \times 10^{13}$ ohm.cm in about seven days. Note that the volume resistivity of the jacket made according to this invention is two orders of magnitude higher that that made as described in the Comparative Example B, which uses hydrocarbon polymer to improve the physical properties of the composition.

What is claimed is:

1. A composition capable of forming a melt-fabricated article that passes the NFPA-255 burn test, comprising melt-fabricable perfluoropolymer, about 10-60 wt % char-forming inorganic agent, and about 0.1 to 5 wt % fluoropolymer additive to total 100 wt % based on the combined weight of said perfluoropolymer, agent and fluoropolymer additive, said fluoropolymer additive acting to disperse said agent in said perfluoropolymer during melt-blending.

2. The composition of claim 1, wherein the fluoropolymer additive is a fluoroelastomer consisting of vinylidene fluoride/hexafluoropropylene (VDF/HFP) copolymer, tetrafluoroethylene/propylene (TFE/propylene) copolymer, vinylidene fluoride/hexafluoropropene/tetrafluoroethylene (VDF/HFP/TFE) copolymer or tetrafluoroethylene/perfluoro (methyl vinyl ether) (TFE/PMVE) copolymer.

3. A melt-fabricated article of the composition of claim 1.

4. The melt-fabricated article of claim 3, wherein said article is a plenum cable jacket.

5. Pellets of the composition of claim 1.

6. The composition of claim 1 wherein said agent is in the form of particles having a mean particle size of no greater than about 3 micrometer.

7. The composition of claim 1 wherein said agent is metal oxide.

8. The composition of claim 1 wherein said agent is ceramic microspheres.

9. The composition of claim 1 wherein said agent comprises a plurality of char-forming agents, at least one of which is ceramic microspheres.

10. A process comprising melt fabricating the composition of claim 1 and obtaining as a result thereof a dispersion of said agent in said perfluoropolymer.

11. The composition of claim 1 wherein said perfluoropolymer is a tetrafluoroethylene/hexafluoropropylene copolymer, wherein the hexafluoropropylene content is about 9-17 wt %, or tetrafluoroethylene/perfluoro(alkyl vinyl ether) copolymer wherein the perfluoroalkyl vinyl ether contains 1 to 5 carbon atoms and its content in the copolymer is about 1-15 wt %.

12. The composition of claim 11, wherein the fluoropolymer additive is a fluoroelastomer consisting of vinylidene fluoride/hexafluoropropylene (VDF/HFP) copolymer, tetrafluoroethylene/propylene (TFE/propylene) copolymer, vinylidene fluoride/hexafluoropropene/tetrafluoroethylene (VDF/HFP/TFE) copolymer or tetrafluoroethylene/perfluoro (methyl vinyl ether) (TFE/PMVE) copolymer.

13. The composition of claim 1 wherein about 0.5 to 3 wt % of said fluoroadditive is present, based on the combined weight of said perfluoropolymer, agent, and fluoroadditive.

14. The composition of claim 1 wherein about 20 to 50 wt % of said char-forming agent is present.

15. The composition of claim 1 wherein about 20 to 50 wt % of said char-forming agent is present and about 0.5 to 3 wt % of said fluoroadditive is present, both based on the combined weight of said perfluoropolymer, agent, and fluoroadditive.

16. The composition of claim 1 wherein said fluoroadditive consists of fluoroelastomer.

* * * * *